US008072737B2

(12) United States Patent
Glover

(10) Patent No.: US 8,072,737 B2
(45) Date of Patent: Dec. 6, 2011

(54) DEVICE FOR USE IN AN ENVIRONMENT WHERE FLAMMABLE GASES MAY BE PRESENT

(75) Inventor: James Clinton Glover, Mercer, PA (US)

(73) Assignee: Joy MM Delaware, Inc., Wilmington, DE (US)

(*) Notice: Subject to any disclaimer, the term of this patent is extended or adjusted under 35 U.S.C. 154(b) by 1132 days.

(21) Appl. No.: 11/847,955

(22) Filed: Aug. 30, 2007

(65) Prior Publication Data

US 2009/0059492 A1 Mar. 5, 2009

(51) Int. Cl.
*G06F 1/16* (2006.01)

(52) U.S. Cl. .................... 361/679.01; 220/3.8; 150/154; 73/431

(58) Field of Classification Search .................... 73/431; 220/3.8; 455/603; 150/154; 361/679.01
See application file for complete search history.

(56) References Cited

U.S. PATENT DOCUMENTS

| | | | | |
|---|---|---|---|---|
| 3,974,933 | A * | 8/1976 | Toth et al. | 220/3.8 |
| 4,112,485 | A * | 9/1978 | Sutter | 362/369 |
| 4,392,185 | A * | 7/1983 | Grossmann et al. | 362/105 |
| 4,435,744 | A * | 3/1984 | Russo | 362/219 |
| 4,543,455 | A * | 9/1985 | Pollerspock | 200/50.3 |
| 4,560,250 | A * | 12/1985 | Russell | 359/604 |
| 4,768,230 | A * | 8/1988 | Viebrantz et al. | 398/106 |
| 4,809,360 | A * | 2/1989 | Kraft | 361/727 |
| 5,023,824 | A * | 6/1991 | Chadima et al. | 361/679.09 |
| 5,080,155 | A * | 1/1992 | Crozier | 150/154 |
| 5,099,687 | A | 3/1992 | Lunzer et al. | |
| 6,521,830 | B1 | 2/2003 | Platz | |
| 7,086,283 | B2 * | 8/2006 | Koyano et al. | 73/431 |

* cited by examiner

*Primary Examiner* — Lisa Lea Edmonds
(74) *Attorney, Agent, or Firm* — Michael Best & Friedrich LLP

(57) ABSTRACT

A device for use in an environment where flammable gases may be present, the device including a sealed water proof exterior housing, and an interior explosion proof, sealed housing made of polycarbonate, mounted inside the exterior water proof housing. An electrical component is inside the interior sealed housing, and an intrinsically safe battery is outside of the interior housing but electrically connected to the component inside the interior housing. The battery is also mounted inside the exterior housing.

9 Claims, 5 Drawing Sheets

DEVICE FOR USE IN AN ENVIRONMENT WHERE FLAMMABLE GASES MAY BE PRESENT

BACKGROUND OF THE INVENTION

This invention relates to a device for use in an environment where flammable gases may be present, and, more particularly to such a device including an exterior housing, with an electrical component and battery inside the housing.

Some devices containing an electrical component have been made of polycarbonate, and polycarbonate is known to have adequate tensile strength and no ability to hold an electrical charge, i.e., it cannot be rubbed with a cloth to create a charge. See U.S. Pat. No. 6,409,942.

Polycarbonate has also been used as a lens for an explosion proof light source is old. See U.S. Pat. Nos. 4,112,485, 4,264,946, 5,534,664, 6,371,625, 6,409,942, and 7,086,283.

In U.S. Pat. No. 4,112,485, it was noted that electric lamps are known in which a light source is placed into a transparent casing and tightly enclosed therein (see German Patent DGM No. 1833690). In other versions, one or several light sources are directly and tightly surrounded with transparent cast polyester or similar material and designated as "explosion-proof" (see British Patent No. 1166442 and U.S. Pat. No. 3,310,670).

None of this prior art addresses how to make a remote control device that can be used in an environment where flammable gases may be present.

Viebrantz et al. U.S. Pat. No. 4,768,230 is directed to a sealed housing for a hand-held remote control transmitter, and Toth et al. U.S. Pat. No. 3,974,933 is directed to an explosion proof and watertight enclosure.

SUMMARY OF THE INVENTION

One of the principal objects of the invention is to provide an improved device for use in an environment where flammable gases may be present, which separates and isolates items presenting any explosion risk from those that re regarded as intrinsically safe. This is especially important because of the significant investment in time required to obtain government approvals for changes to such devices. By placing the devices of greatest concern all within an explosion proof interior housing, the ability to improve the device without having to obtain further approvals is presented.

Another of the principal objects of the invention is to provide such a device that solves the problem of how to do this in a handheld device.

The invention thus provides a device for use in an environment where flammable gases may be present, the device including a sealed water proof exterior housing, and an interior explosion proof, sealed housing made of polycarbonate, mounted inside the exterior water proof housing. An electrical component is inside the interior sealed housing, and an intrinsically safe battery is outside of the interior housing but electrically connected to the component inside the interior housing. The battery is also mounted inside the exterior housing.

Figure 1:
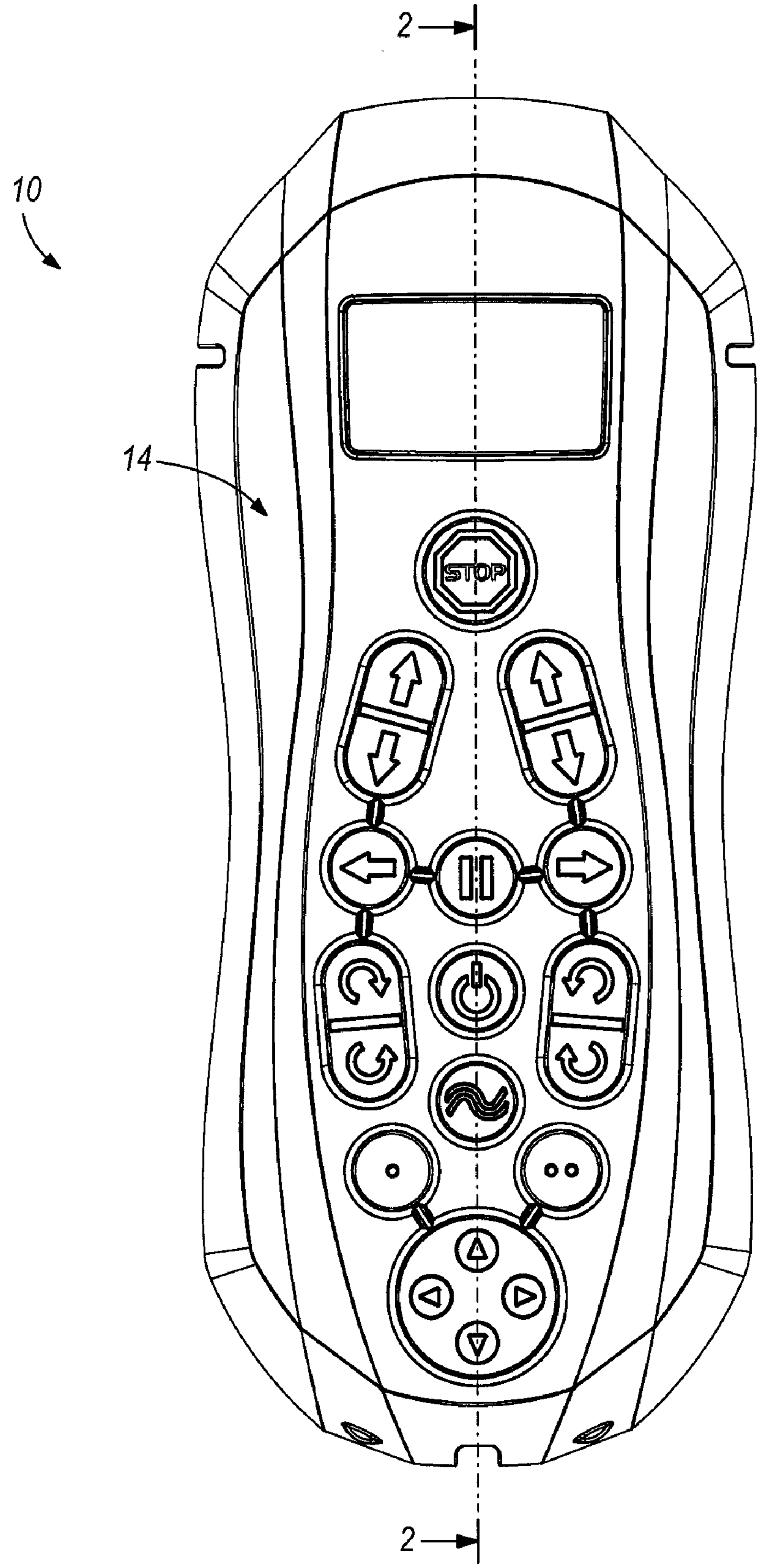
FIG. 1 is a top view of a device for use in an environment where flammable gases may be present in accordance with this invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience in reference to the drawings and are not to be construed as limiting terms.

DETAILED DESCRIPTION OF THE PREFERRED EMBODIMENT

As illustrated in FIG. 1 of the drawings, the invention is a device 10 for use in an environment where flammable gases may be present. In this particular embodiment, the device is a remote control 10, but the invention is equally applicable to other electrical devices for use in environments where flammable gases may be present.

Figure 2:
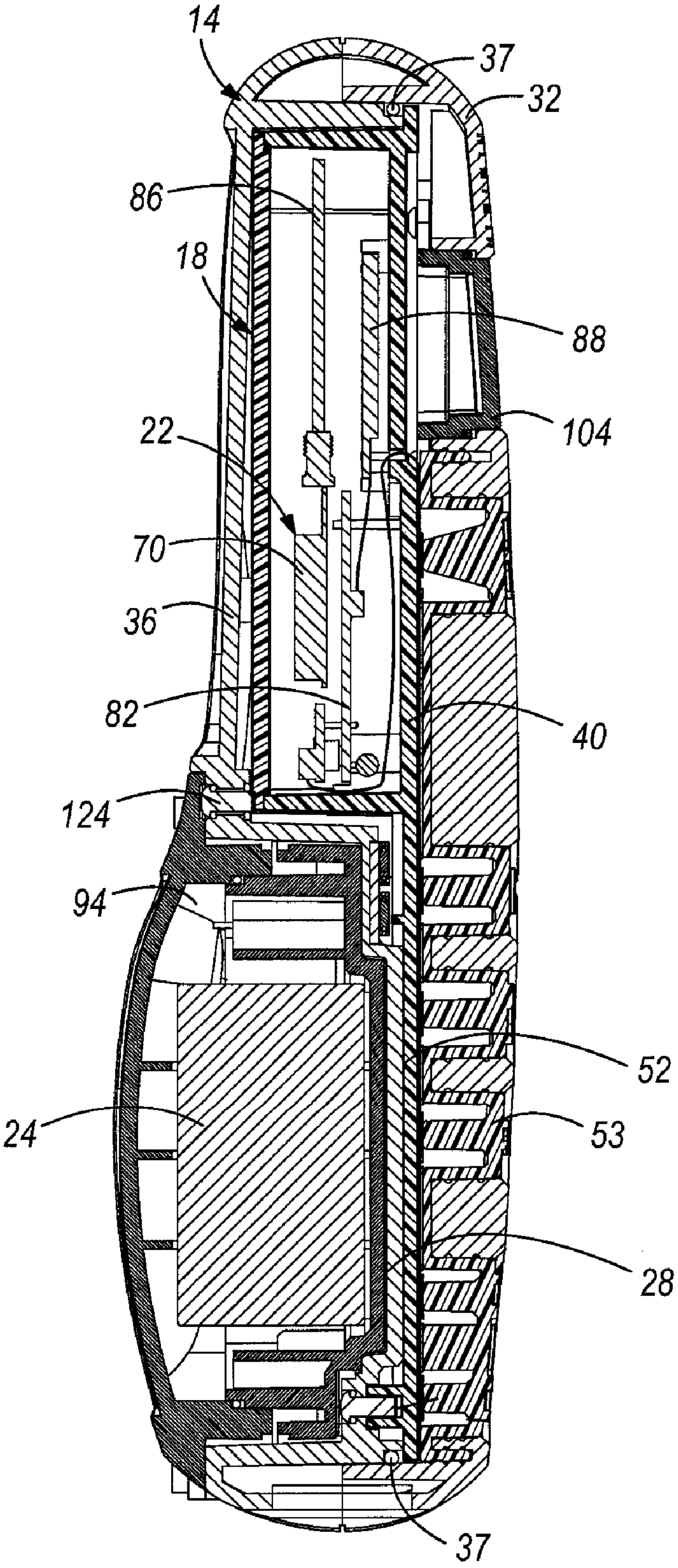
FIG. 2 is a cross-sectional view of the device of FIG. 1 taken along the 2-2 in FIG. 1.

As shown in FIG. 2, the remote control device 10 includes a sealed water-proof exterior housing 14, an interior explosion proof, sealed housing 18 made of polycarbonate, mounted inside the exterior water proof housing 14 and, an electrical component 22 inside the interior sealed housing 18. The device 10 also includes an intrinsically safe battery 24 outside of the interior housing 18 but electrically connected to the component 22 inside the interior housing 18, the battery 24 being mounted inside the exterior housing 14 in a battery carrier assembly 28.

Figure 4:
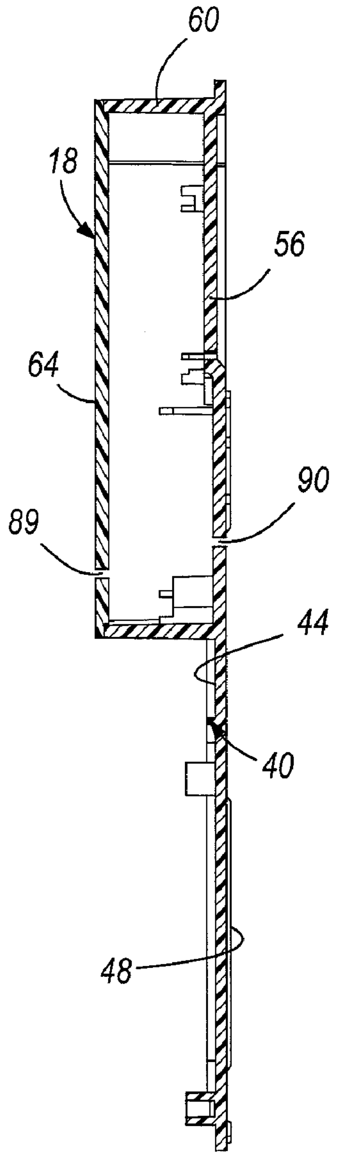
FIG. 4 is a cross-sectional view of the structural member of FIG. 3, taken along the line 4-4 in FIG. 3.
Figure 3:
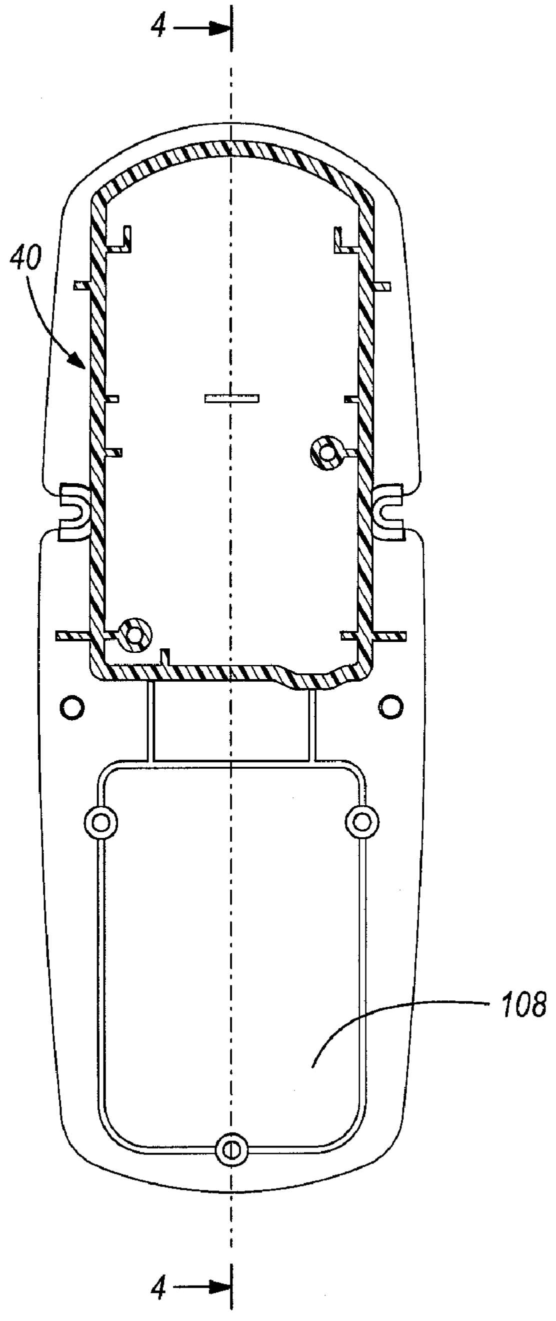
FIG. 3 is a top view of a structural member held within the device exterior housing.

More particularly, the exterior housing 14 is made in two separate sections, a polycarbonate top molding 32 and a polycarbonate bottom molding 36, with a seal 37 received between the top and bottom moldings. Sandwiched between the two sections is a structural member 40. The structural member 40 completely separates one side of the device 10 from the other side of the device 10. The structural member 40 is planar and has a back 44 (see FIG. 4) and a front 48 and the interior housing 18 is attached to or formed as a part of the structural member back 44. As shown in FIG. 1, the polycarbonate top molding 32 is attached to the front 48 of the structural member 40 and surrounds a membrane keypad 52. Keys 53*a* are also held in place by the top molding 32 and form a rubber (polyurethane) mechanical connection between the operator and the actual membrane keypad 52.

Further, the interior housing 18 is an explosion proof rectangular chamber attached to the structural member 40. More particularly, the interior housing 18 has a base 56, four sides 60, and a top 64. In the preferred embodiment, the base 56 and four sides 60 are formed integrally with the structural member 40, but in other embodiments, they can be separate pieces that are connected and sealed together. The interior housing 18 is totally enclosed and sealed by chemically welding the interior housing top 64 to the edges of the housing four sides 60.

Figure 7:
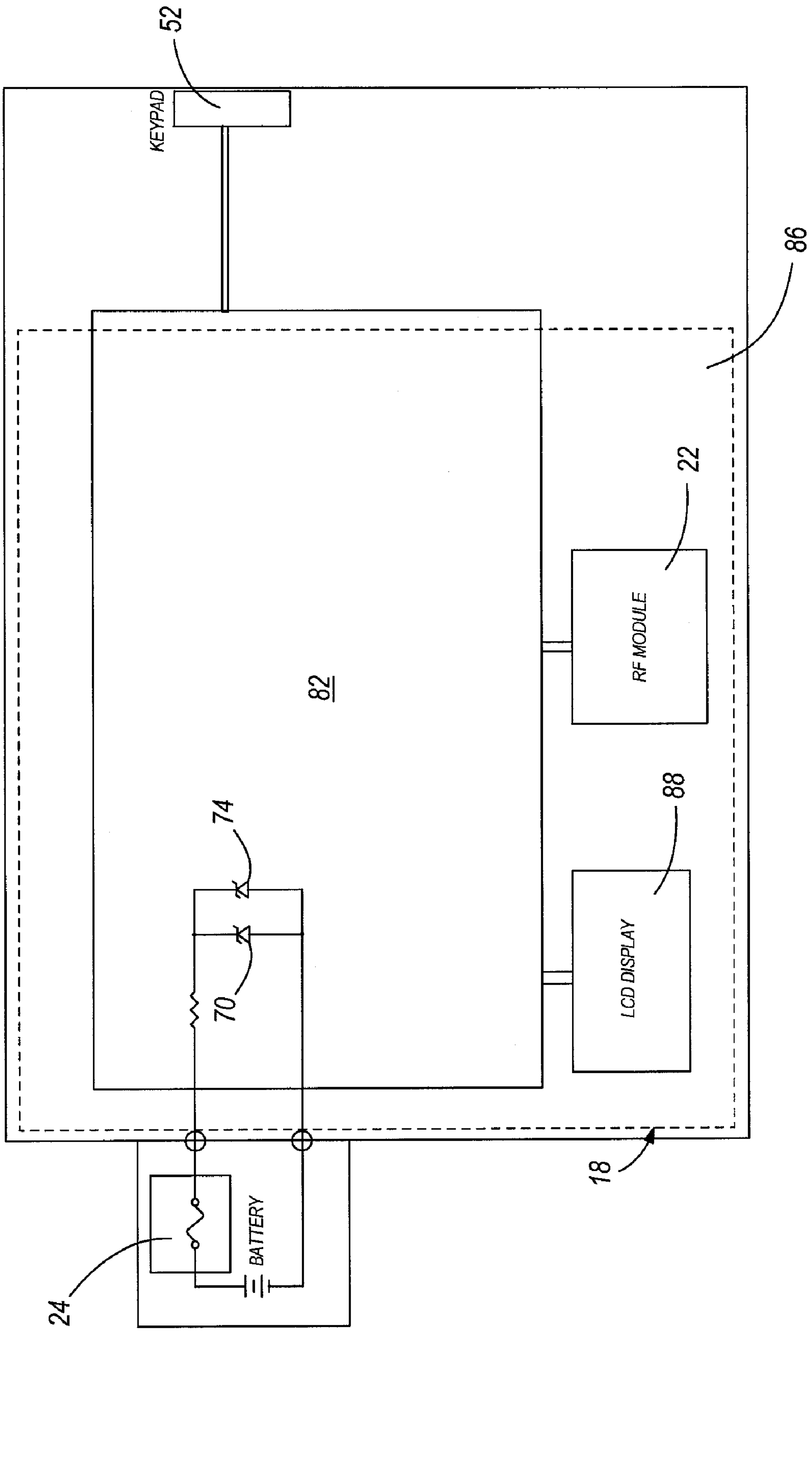
FIG. 7 is a schematic representation of the electrical components of the device in accordance with the invention.

The electrical component 22 inside the interior housing is a radio frequency module 70. Still more particularly, as shown schematically in FIG. 7, there are a plurality of electrical components within the explosion proof chamber 18, and the components in addition to the radio frequency module 70 are two diodes 70 and 74, and a resistor 78, all mounted on a printed circuit board 82. A printed circuit board antenna 86 and an LCD screen 88 are also within the explosion proof chamber 18. A clear silicon elastomer electrical potting compound 86 further encloses the electrical components inside the interior explosion proof rectangular chamber housing 18.

The device 10 has an interface between the battery 24 and the electrical component 22, and the interface is inside the interior housing 18. More particularly, an opening 89 into the interior housing 18 through the interior housing top 64 receives a wire 94 extending from the battery carrier assembly 28, before the interior of the interior housing 18 is potted.

More particularly, the device further includes a polycarbonate lens 104 attached to the structural member front 48, so that the LCD screen 88 can be seen outside the housing 14, and a battery compartment area 108 on the structural member back 44 adjacent the interior housing 18. The membrane keypad 52 is connected to the electrical component 22 inside the interior housing 18 via an opening 90 in the front 48 of the structural member 40.

Figure 5:
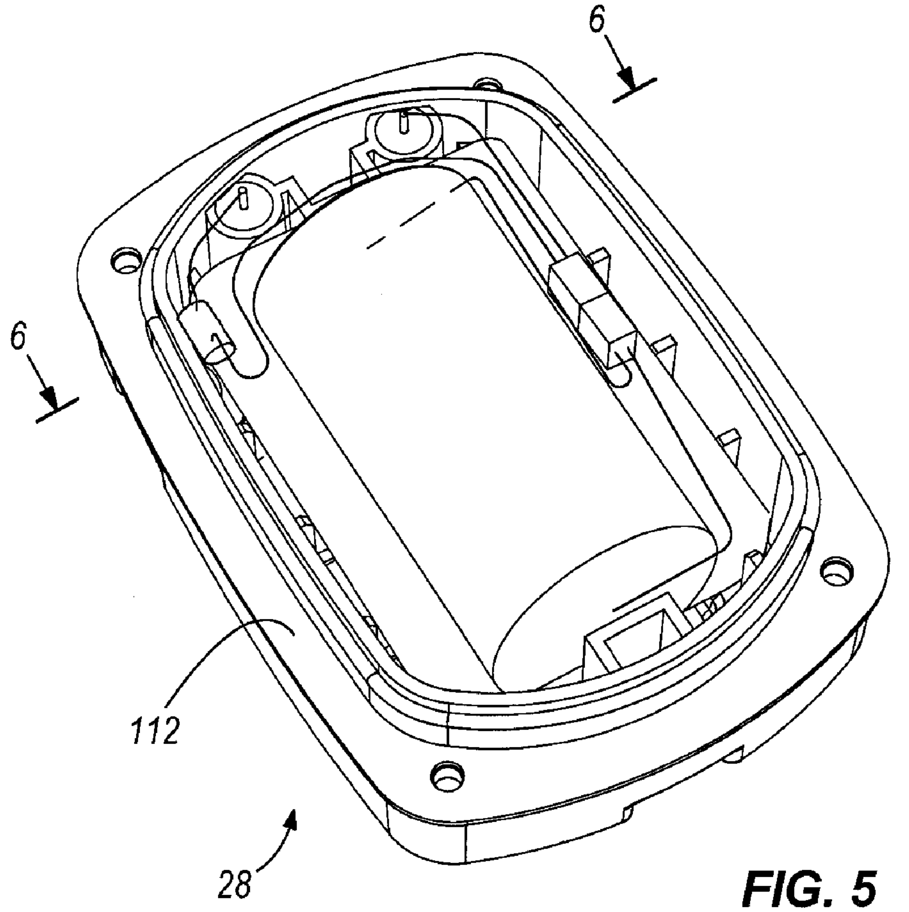
FIG. 5 is a perspective view of the battery housing shown in FIG. 2.
Figure 6:
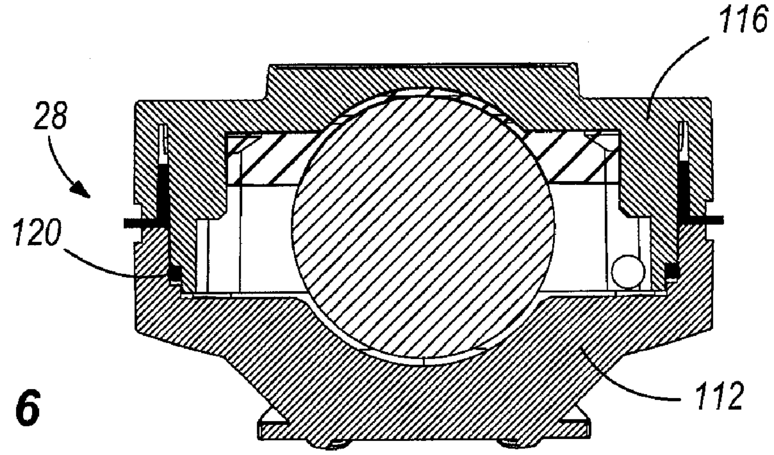
FIG. 6 is a cross-sectional view of the battery within the battery housing taken along the line 6-6 in FIG. 5.

As shown in FIGS. 5 and 6, the battery carrier assembly 28 comprises a battery carrier 112, and a battery compartment cover 116. Both the carrier 112 and the battery compartment cover 116 are polycarbonate moldings. An O-ring seal 120 sits between the battery cover 116 and the battery carrier 112. The battery carrier assembly 28 is held in the battery compartment area 108 by a socket head cap screw 124 (see FIG. 2).

Various other features and advantages of the invention will be apparent from the following claims.

The invention claimed is:

1. A device for use in an environment where flammable gases may be present, the device including a sealed water proof exterior housing, an interior explosion proof, sealed housing made of polycarbonate, mounted inside said exterior water proof housing, an electrical component inside said interior sealed housing, and an intrinsically safe battery outside of said interior housing but electrically connected to said component inside said interior housing, said battery being mounted inside said exterior housing.

2. A device in accordance with claim 1 wherein said electrical component is a radio frequency module.

3. A device in accordance with claim 1 wherein said device further includes a resistor inside said interior housing.

4. A device in accordance with claim 1 wherein said device further includes electrical potting inside said interior housing.

5. A device in accordance with claim 1 wherein said device further includes a structural member that completely separates one side of said device from the other side of said device.

6. A device in accordance with claim 5 wherein said structural member is planar and has a back and a front and said interior housing is attached to said back.

7. A device in accordance with claim 5 wherein said interior housing is an explosion proof rectangular chamber attached to said structural member.

8. A device in accordance with claim 5 wherein the device further includes a membrane keypad on said structural member front, a polycarbonate lens attached the structural member front, and a battery compartment area on the structural member adjacent the interior housing.

9. A device in accordance with claim 1 wherein said device further includes an antenna inside said interior housing.

* * * * *